United States Patent [19]
Nakanishi et al.

[11] Patent Number: 5,546,206
[45] Date of Patent: Aug. 13, 1996

[54] CONCEALING A BRIGHT DEFECT USING LIGHT BLOCKING MEANS TO BLOCK ONLY THE WAVELENGTH BAND SHED ONTO THE DEFECTIVE PIXEL

[75] Inventors: Hiroshi Nakanishi, Sakurai; Hiroshi Hamada, Nara, both of Japan

[73] Assignee: Sharp Kabushiki Kaisha, Osaka, Japan

[21] Appl. No.: 518,826

[22] Filed: Aug. 24, 1995

[30] Foreign Application Priority Data

Aug. 29, 1994 [JP] Japan .................... 6-204036

[51] Int. Cl.[6] .......... G02F 1/1335; G02F 1/136; G02F 1/1333
[52] U.S. Cl. .............. 359/67; 359/40; 359/41; 359/59
[58] Field of Search ................ 359/40, 67, 59, 359/41

[56] References Cited

U.S. PATENT DOCUMENTS

| | | | |
|---|---|---|---|
| 4,798,448 | 1/1989 | van Raalte | 359/41 |
| 5,132,830 | 7/1992 | Fukutani et al. | 359/67 |
| 5,142,386 | 8/1992 | Ishihara | 359/67 |
| 5,267,066 | 11/1993 | Nakai et al. | 359/67 |
| 5,280,374 | 1/1994 | Nakai et al. | 359/67 |
| 5,307,185 | 4/1994 | Jones et al. | 359/41 |
| 5,368,991 | 11/1994 | Uchikawa et al. | 430/288 |
| 5,473,453 | 12/1995 | Kuramatsu | 359/67 |

FOREIGN PATENT DOCUMENTS 1-187532  7/1989  Japan .

*Primary Examiner*—Anita Pellman Gross
*Assistant Examiner*—Toan Ton
*Attorney, Agent, or Firm*—David G. Conlin; Milton Oliver

[57] ABSTRACT

A method of concealing a bright defect in a transmission display device which displays by selectively transmitting plural beams different wavelength bands shed onto corresponding pixels of a transmission display element through a microlens according to a voltage applied to each pixel is arranged such that only a beam of a wavelength area shed onto a defective luminance point pixel is selectively blocked. On the other hand, the beam shed onto normal pixels surrounding the defective pixel, wherein a bright defect is not generated would be transmitted through the liquid crystal display panel without being blocked. Therefore, the method enables only the defective luminance point pixel to be concealed without affecting the normal pixels, thereby improving a display quality of the transmission display device.

16 Claims, 10 Drawing Sheets

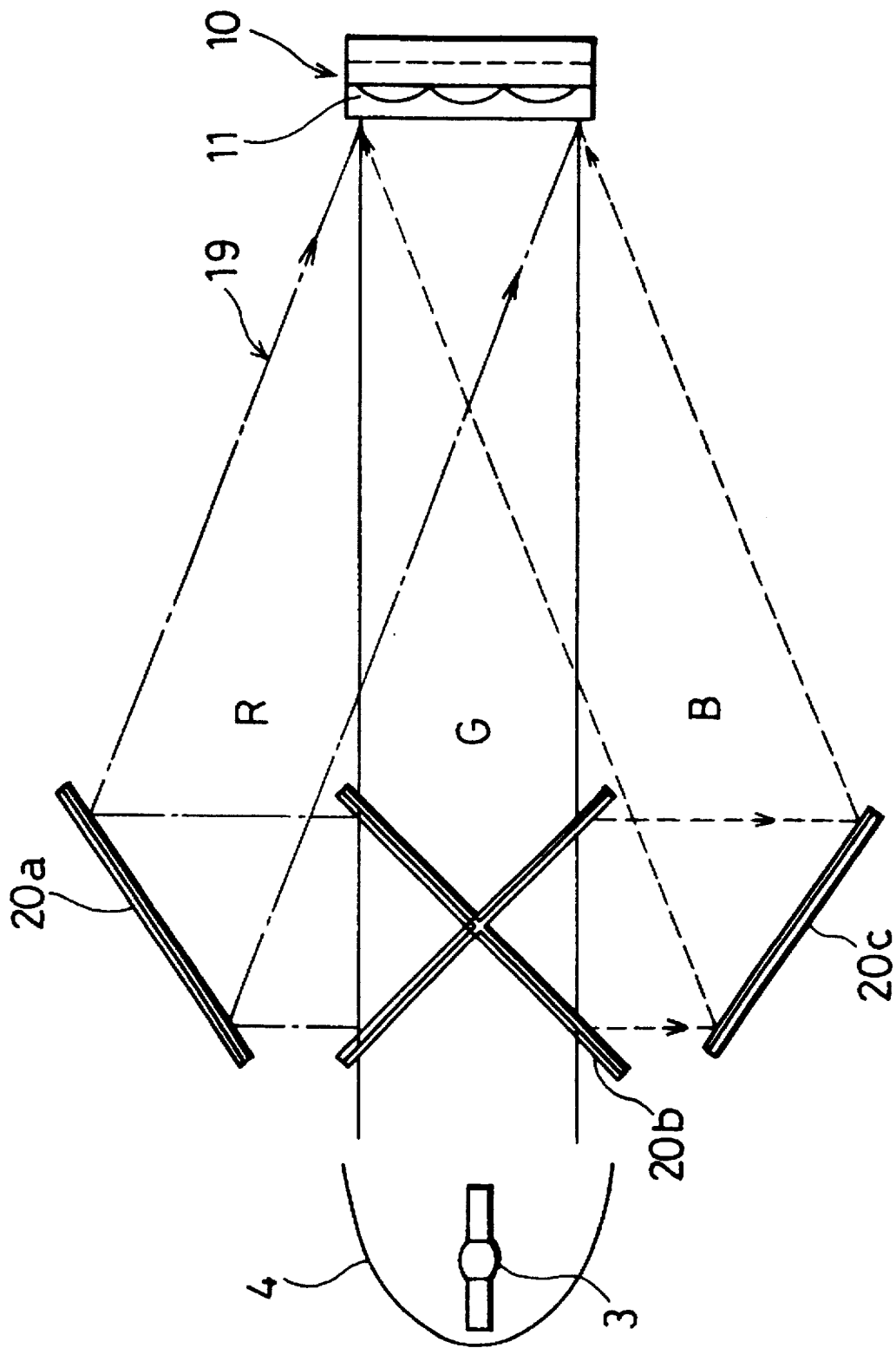

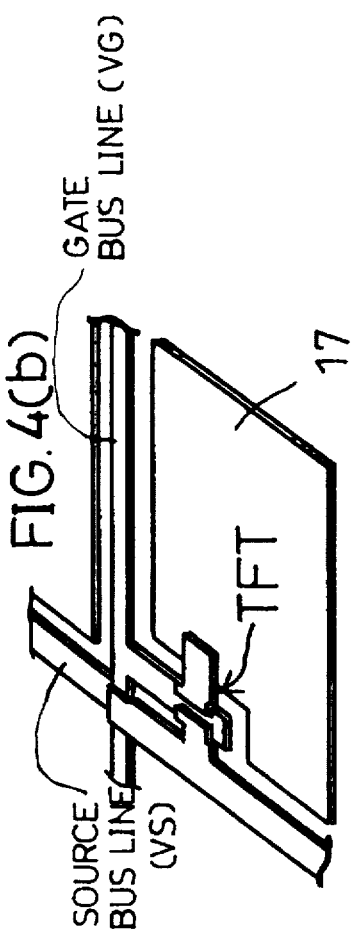
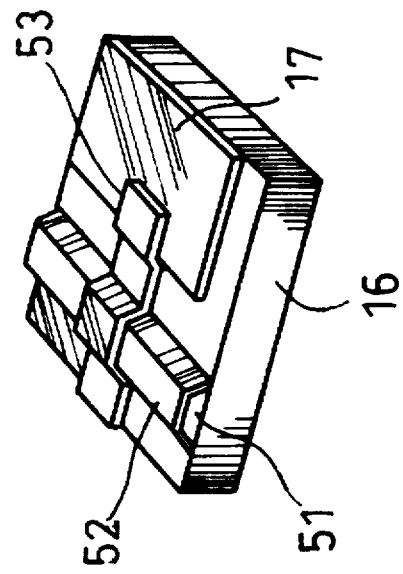
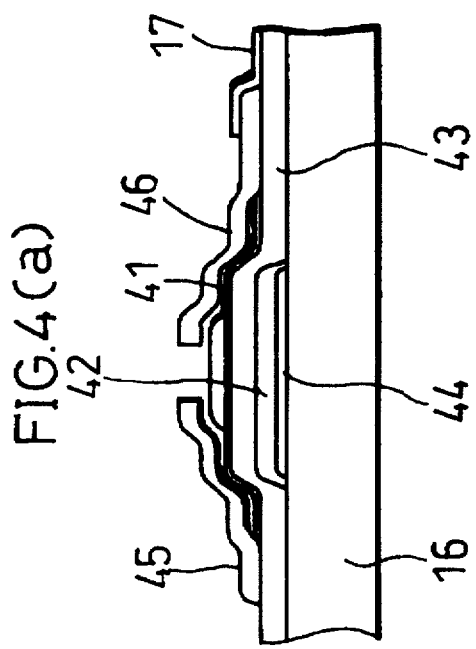
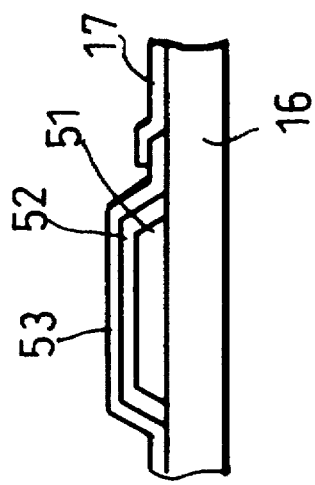

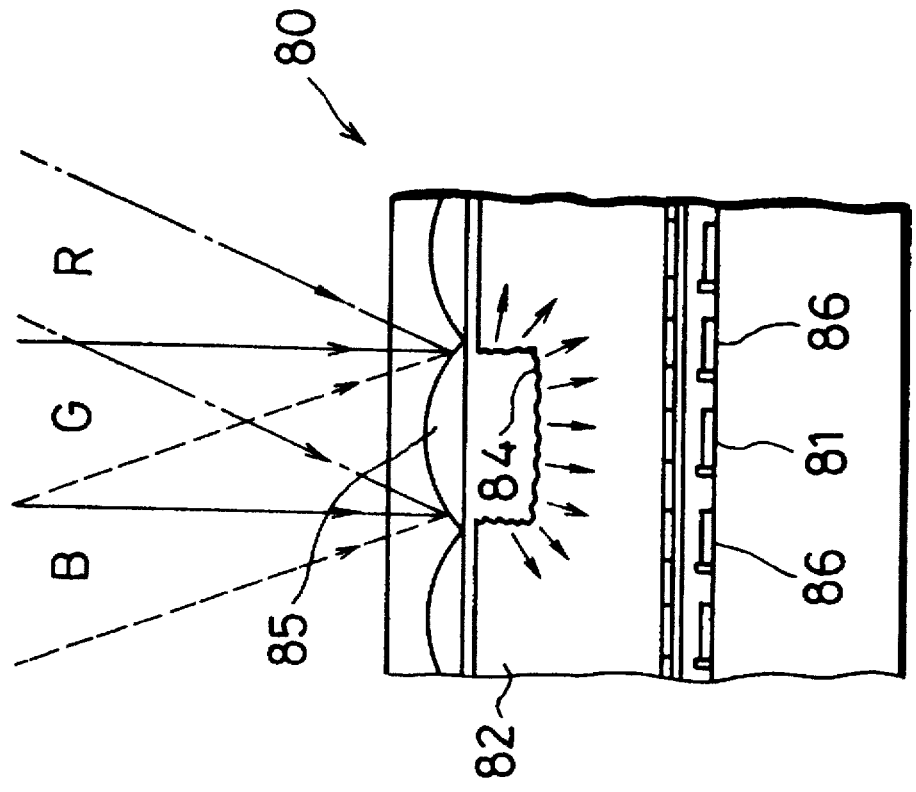
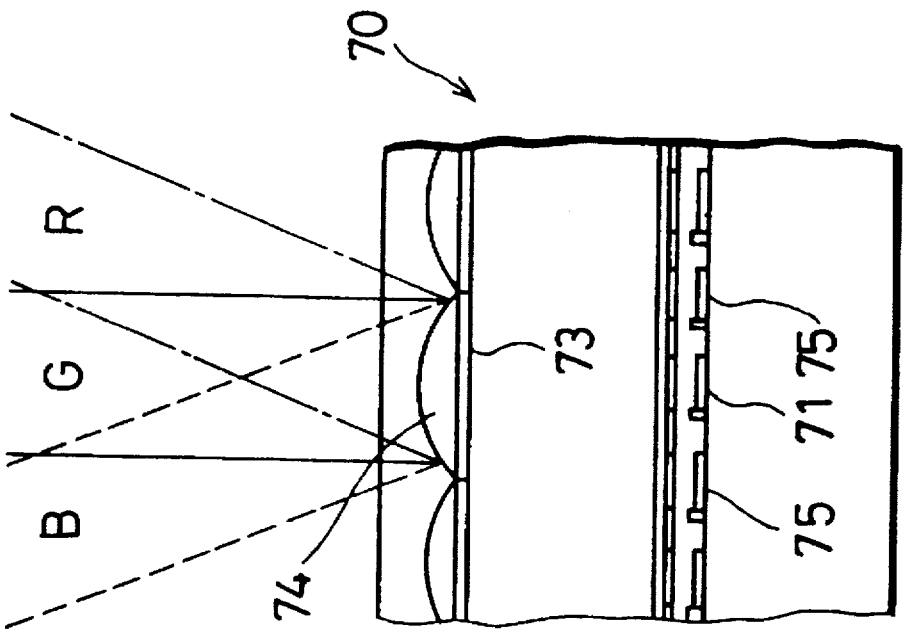

CONCEALING A BRIGHT DEFECT USING LIGHT BLOCKING MEANS TO BLOCK ONLY THE WAVELENGTH BAND SHED ONTO THE DEFECTIVE PIXEL

FIELD OF THE INVENTION

The present invention relates to a method of concealing a bright defect in a transmission liquid crystal display device having plural display pixels arranged in a matrix form.

BACKGROUND OF THE INVENTION

A transmission display element displays an image, a character, etc., by varying its transmittance in response to a driving signal and modulating the intensity of light emitted from a light source, and the transmission display element itself does not emit light.

Examples of such transmission display element include: a liquid crystal display panel, an electrochromic display, a display using a transmission ceramic such as PLZT (Lead Zirco-Titanate doped with lanthanum), etc. Among the above-listed transmission display elements, the liquid crystal display panel has been used in a variety of fields such as a pocketable TV, a word processor, etc.

A pixel is a minimum display unit, and plural pixels are regularly arranged in the liquid crystal display panel. By applying independent driving voltage to the respective pixels, the optical characteristics of the liquid crystal vary, thereby displaying an image, a character, etc.

Examples of the method of applying an independent driving voltage to each pixel include: a simple matrix method and an active matrix method. In the active matrix method, a driving element such as a thin film transistor (TFT), a metal insulator metal (MIM), etc., is formed on each pixel in order to display an image of improved quality and super resolution.

FIGS. 4(a) and (b) are explanatory views of the present invention. As shown in these figures, the driving element composed of the thin film transistor is arranged such that a semiconductor layer, an insulating layer and electrodes of various types are laminated on a glass substrate 16. More specifically, the semiconductor layer is composed of an amorphous silicon 41 and an anodic oxide film 42, the insulating layer is a gate insulating film 43, and the electrodes are a gate electrode 44, a source electrode 45, a drain electrode 46 and a pixel electrode 17 (liquid crystal driving use electrode) in the example shown in FIGS. 4(a) and (b). FIGS. 5(a) and (b) show an example of a driving element composed of the MIM which comprises the glass substrate 16 whereon an X-electrode (tantalum) 51, an insulating layer, a metal thin film and a pixel electrode 17 (liquid crystal driving use electrode) are laminated. More specifically, the insulating layer is an oxide tantalum 52, and the metal thin film is a chrome thin film 53 in the example shown in FIGS. 5(a) and (b). The X-electrode 51 is connected to the pixel electrode 17 through the-oxide tantalum 52 and the chrome thin film 53.

As described, both the driving element composed of the thin film transistor and the driving element composed of the MIM have a multilayer structure. In order to form the described multilayer structure, a process of patterning each layer on the glass substrate is repetitively performed. In this patterning process, for example, a defective TFT which does not show normal TFT characteristics may generate, and this causes the problem that a voltage cannot be applied to the corresponding pixel electrode 17. The defective pixel to which a voltage cannot be applied always allows light to transmit therethrough, and in the state where the normal pixels surrounding the defective pixel block the transmission of light, the pixel electrode corresponding to the defective TFT would be recognized as a bright defect.

An example of the method of concealing such bright defect is disclosed in Japanese Laid-Open Patent Application No. 2160/1993 (Tokukaihei 5-2160), wherein in a liquid crystal panel 70, light-blocking means 73 made of, for example, a black ultraviolet curing resin is formed on a glass substrate 72 on a light incident side at a position corresponding to a defective luminance point pixel 71 as shown in FIG. 9.

Another example of the method of concealing such bright defect is disclosed in Japanese Laid-Open Patent Application No. 301615/1992 (Tokukaihei 4-301615), wherein in a liquid crystal panel 80, a convex portion 84 is formed on a glass substrate 82 on a light incident side corresponding to a defective luminance point pixel 81, the convex portion 84 being surface-roughened by an excimer laser beam 83 so as to scatter a light beam shed thereon as shown in FIG. 10. By forming this convex portion 84, the light emitted from the light source to be incident on the defective pixel 81 would be scattered, and the amount of light incident on the defective pixel 81 would be reduced to such a level that the luminance point of the defective pixel 81 becomes inconspicuous.

However, in the described conventional methods of concealing the bright defect in the transmission display device, all the light would be blocked or scattered irrespectively of the wavelength of the light. Therefore, when adapting the described method to such transmission color display devices in which three picture elements correspond to a single microlens (see FIGS. 11(a) and (b) which are cross-sectional views in the horizontal direction in the case where the microlens is placed as shown in FIG. 6), the following problems would arise.

In the transmission color display devices shown in FIGS. 11(a) and (b), single-microlens 74 and 85 are provided respectively for plural pixels 71 and 75, and pixels 81 and 86, which correspond to light of plural wavelength bands, i.e., red R, green G and blue B. When applying any one of the above-mentioned two methods to the case where pixels 71 and 81 are defective pixels in these transmission color display devices, not only a beam incident on the defective luminance point pixels 71 and 81, but all the beams incident on all the pixels 71 and 75, 81 and 86 including normal pixels 75 and 86 would be blocked or scattered. Since this causes the amount of light incident on the normal pixels 75 and 86 to be reduced, the normal display would not be performed.

SUMMARY OF THE INVENTION

An object of the present invention is to provide a method of concealing a bright defect in a transmission display device, which enables only a defective luminance point pixel to be concealed without adversely affecting normal pixels, the method being applicable to a transmission display device wherein a single microlens corresponds to plural pixels.

In order to achieve the above object, in the method of concealed for a bright defect in a transmission display device of the present invention, which displays by selectively transmitting plural beams separated into band of different wavelengths, shed onto corresponding pixels of a transmission display element through a microlens, according to a voltage applied to each pixel, a beam of a wavelength band shed onto a defective luminance point pixel is selectively blocked.

According to the described method of concealing a defective luminance point pixel, upon irradiating corresponding pixels through the microlens with plural beams separated into band of different wavelengths, only the beam of a wavelength band shed onto a defective luminance point pixel would be blocked. Thus, the beam of the wavelength band would not be allowed to transmit through the transmission display element. On the other hand, the beam of the wavelength band shed onto surrounding normal pixels wherein a luminance point defect is not generated can be transmitted through the transmission display element without being blocked.

Therefore, even in the transmission display device wherein plural pixels correspond to a single microlens, only the defective luminance point pixel can be concealed without affecting normal pixels. As a result, an improved display quality of the transmission display device can be achieved.

In the described method, it is preferable that only the beam shed onto the defective luminance point pixel is blocked using an ultraviolet curing resin including a material which selectively absorbs the beam of a wavelength band to be blocked. In this manner, only the beam of the wavelength band shed onto a defective luminance point pixel can be selectively absorbed by the resin which selectively absorbs the beam of the wavelength band. As a result, the beam of the wavelength band would not be allowed to transmit through the transmission display element. Whereas, the beam of the wavelength band shed onto the normal pixel wherein a bright defect is not generated can be transmitted through the transmission display element without being absorbed by the ultraviolet curing resin.

For a fuller understanding of the nature and advantages of the invention, reference should be made to the ensuing detailed description taken in conjunction with the accompanying drawings.

BRIEF DESCRIPTION OF THE DRAWINGS

FIG. 3 which shows one modified example of the transmission color liquid crystal display device regarding an arrangement for dividing white light is an explanatory view showing a method of dividing the white light using a cross-dichroic mirror.

FIG. 4(a) is a cross sectional view showing a structure of a TFT which drives pixel electrodes of the transmission color liquid crystal display device.

FIG. 4(b) is a perspective view showing the pixel electrode and the TFT in the transmission color liquid crystal display device.

FIG. 5(a) is a cross sectional view showing a structure of a MIM which drives a pixel electrode in the transmission color liquid crystal display device.

FIG. 5(b) is a perspective view showing the pixel electrode and the MIM in the transmission color liquid crystal display device.

FIG. 11(a) is an explanatory view showing a transmission color liquid crystal display device adopting the method of concealing a bright defect shown in FIG. 9.

FIG. 11(b) is an explanatory view showing a transmission color liquid crystal display device adopting the method of concealing a bright defect shown in FIG. 10.

DESCRIPTION OF THE EMBODIMENTS

EMBODIMENT 1

Figure 1:
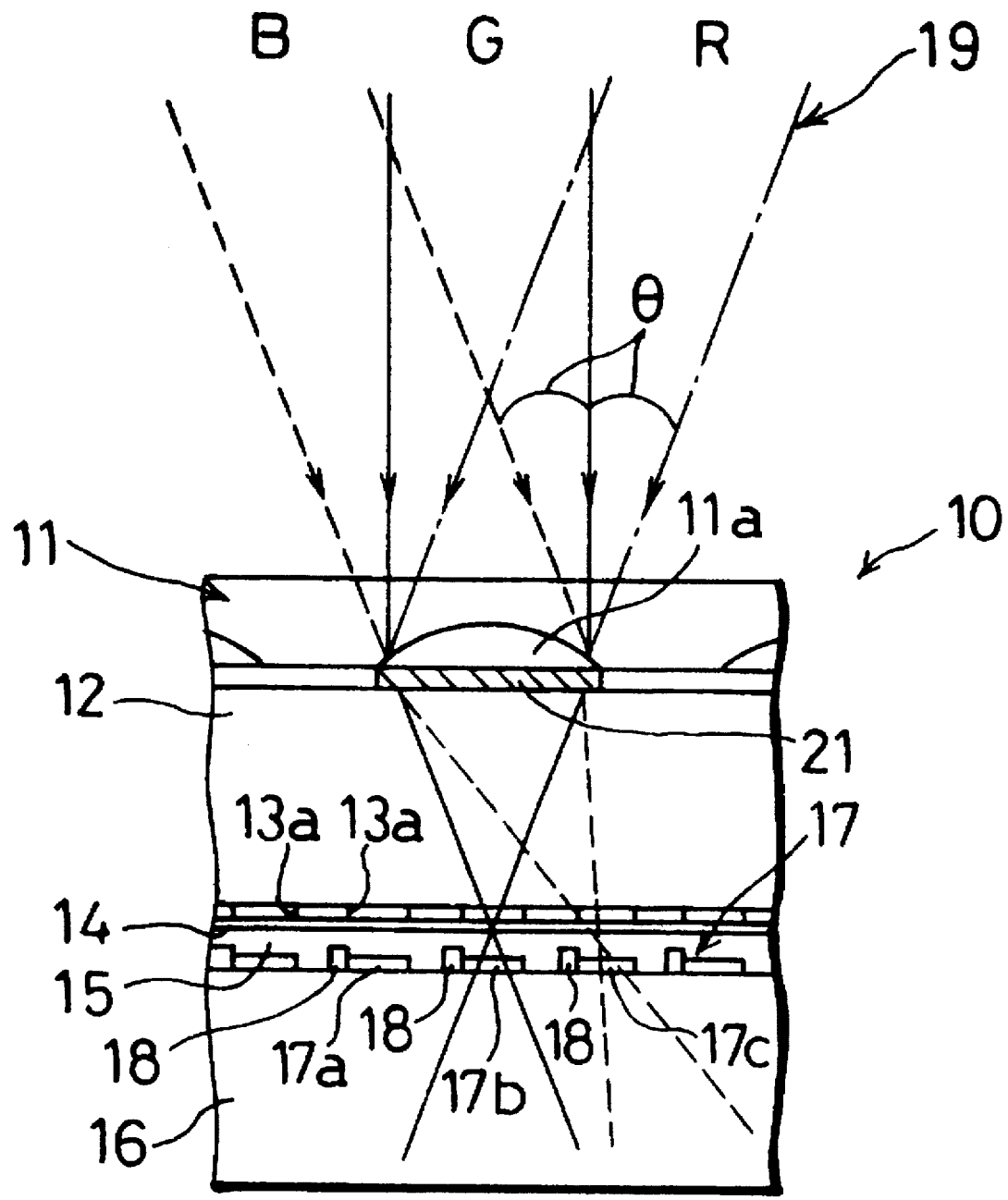
FIG. 1 is an explanatory view showing a liquid crystal display panel of a transmission color liquid crystal display device adopting a method of concealing a bright defect in accordance with one embodiment of the present invention.

The following descriptions will discuss one embodiment of the present invention in reference to FIG. 1 through FIG. 6. Examples of a transmission display element include: a liquid crystal display device, an electrochromic display, a display using a transmission ceramic such as PLZT (Lead Zirco-Titanate doped with lanthanum), etc. In the present embodiment, the method of concealing a bright defect in a transmission color liquid crystal display 1 for color display shown in FIG. 2 will be mainly explained.

The transmission color liquid crystal display device 1 is composed of a liquid crystal display panel 10 as a transmission display element and a light emitting unit 2 for irradiating the liquid crystal panel 10 with a light beam.

The light emitting unit 2 includes a white light source 3 and a reflective mirror 4, and further includes dichroic mirrors 6a, 6b and 6c in an optical path.

Suitable examples of the white light source 3 include: a discharge lamp such as a metal halide lamp, etc., a halogen lamp, a xenon lamp, etc.

The reflective mirror 4 is arranged such that a reflecting surface is formed on a paraboloid, and a focus point of the reflecting surface coincides with a center of a light emitting section of the white light source 3. Therefore, the reflective mirror 4 reflects white light emitted from the white source 3, and the reflected light from the reflective mirror 4 forms a substantially parallel beam and is incident on the dichroic mirrors 6a, 6b and 6c.

These three dichroic mirrors 6a, 6b and 6c are placed at mutually different angles with respect to the parallel beam. The dichroic mirror 6a has characteristics such that it selectively reflects only a beam of a wavelength band corresponding to red (around 600 μm through 700 μm) of the white light, and allows beams of other wavelength bands to transmit therethrough. The dichroic mirror 6b selectively reflects only a beam of a wavelength band corresponding to green (around 500 μm through 600 μm) of the white light, and allows beams of other wavelength bands to transmit therethrough. Further, the dichroic mirror 6c selectively reflects only a beam of a wavelength band corresponding to blue (around 400 μm through 500 μm) of the white light, and allows beams of other wavelength bands to transmit therethrough.

The dichroic mirrors 6c, 6b and 6a are placed in this order from the side of the white light source 3. Namely, the dichroic mirrors 6c, 6b and 6a are placed in this order on the optical axis of the white light emitted from the white light source 3 so as to divide the white light into beams 19 of three primary colors, i.e., a blue beam (hereinafter referred to as "B"), a green beam (hereinafter referred to as "G"), and a red beam (hereinafter referred to as "R"). Then, the R, G and B thus divided are shed onto a microlens 11a of the microlens array 11 in the liquid crystal panel 10 at mutually different incident angles.

Here, as an infrared ray and an ultraviolet ray have adverse effects on liquid crystal molecules, it is required to arrange such that the dichroic mirrors 6a, 6b and 6c allow the beams of the infrared ray and ultraviolet ray bands to transmit therethrough. Alternatively, the adverse effects from the infrared ray and the ultraviolet ray may be prevented by placing an infrared ray/ultraviolet ray cut filter between the white light source 3 and the liquid crystal display panel 10 except the area from the dichroic mirror 6c to the dichroic mirror 6a. Here, the difference in relative placement angles among the dichroic mirrors 6a, 6b and 6c, i.e., the difference in relative incident angles of the white light among the dichroic mirror 6a, 6b and 6c is computed based on the pitch of the pixel array in a horizontal direction of the liquid crystal panel 10, and the focal distance of the microlens 11a of the microlens array 11.

The placement order of the dichroic mirrors 6c, 6b and 6a are not limited to the described order. For example, the dichroic mirrors 6a, 6b and 6c may be placed in this order. For the method of dividing the white light emitted from the white light source 3 into R, G and B-beams 19, for example, as shown in FIG. 3, a method wherein a cross dichroic mirror 20b and dichroic mirrors 20a and 20c are combined may be used.

As shown in FIG. 1, the liquid crystal display panel 10 includes a microlens array 11 having plural microlenses 11a, an incident side glass substrate 12, a pixel opening 13a, a counter electrode 14 (transparent electrode), a liquid crystal layer 15 and a light coming-out side glass substrate 16 which are laminated in this order from the light incident side. The transmission color liquid crystal display device 1 of the present embodiment is arranged such that light is divided into different colors by means of the dichroic mirrors 6a, 6b and 6c and the microlens array 11. Thus, the color filter which is required in the conventional simple liquid crystal display panel can be eliminated.

The arrangement process is applied on the surfaces of the incident side glass substrate 12 and the light coming-out side glass substrate 16 which face one another, so that the liquid crystal molecules are twisted at 90°, and, for example, a nematic liquid crystal is sealed in the liquid crystal layer 15 formed between the substrates 12 and 16.

On an inner surface of the light coming-out side glass substrate 16, pixel electrodes 17 corresponding to the three primary colors of R, G and B are arranged in a matrix form and TFTs (Thin Film Transistor) 18 for switching the voltage to be applied to respective pixel electrodes 17 are formed.

Namely, in the liquid crystal panel 10, by applying an independent driving voltage to each of the pixel electrodes 17 (minimum display unit) which are regularly arranged in a matrix form, the optical characteristics of the liquid crystal vary, thereby displaying an image, a character, etc.

The method of applying an independent driving voltage to each pixel electrode 17 includes: the simple matrix system and the active matrix system. In the transmission color liquid crystal display device 1, an active matrix system is adopted wherein a driving element such as a thin film transistor (TFT) 18, etc., is formed on each pixel in order to display an image of an improved quality and super resolution. The method of concealing a defective luminance point pixel of the transmission color liquid crystal display 1 of the present embodiment may be adopted also in the simple matrix system.

As shown in FIG. 4(a) and (b), the TFT 18 which is the driving element of the pixel electrode 17 comprises the glass substrate 16 whereon a semiconductor layer composed of an amorphous silicon 41, an anodic oxide film 42, etc., an insulating layer composed of a gate insulating film 43, etc., and electrodes of various types including a gate electrode 44, a source electrode 45, a drain electrode 46, the pixel electrode 17 (liquid crystal driving-use electrode) are laminated. In the present embodiment, the driving element composed of the TFT 18 is adopted as an example of the active matrix system. However, the present invention is not limited to this arrangement, and the driving element composed of the MIM (Metal-Insulator-Metal) may be used.

As shown in FIGS. 5(a) and (b), the driving element composed of the MIM has a laminated structure wherein an X-electrode 51 made of tantalum is formed on the glass substrate 16 so as to be connected to the pixel electrode 17 (liquid crystal driving-use electrode), etc., through the oxide tantalum 52 (insulating layer) and the chrome thin film 53, etc.

Figure 6:
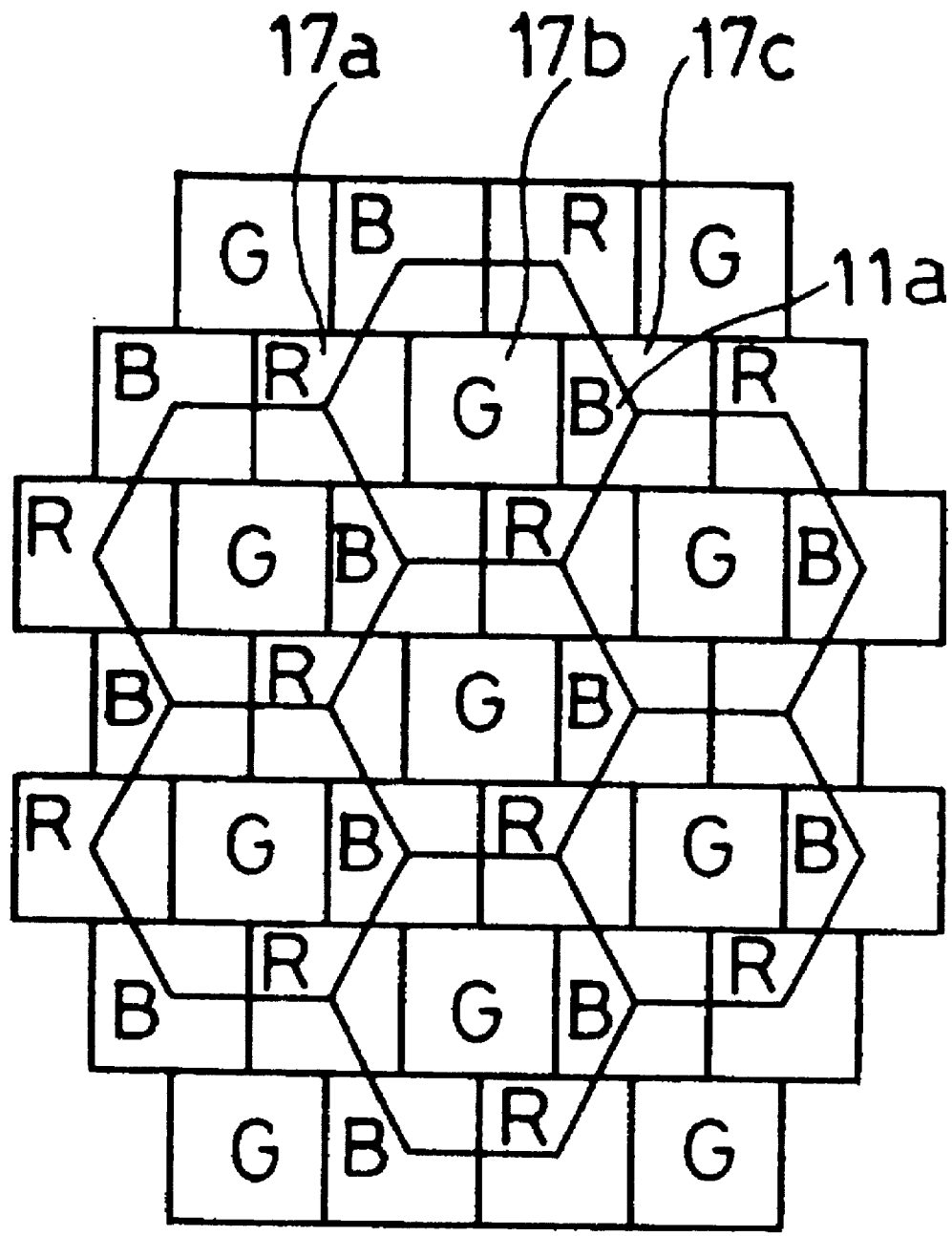
FIG. 6 is a plan view showing a correlation between a pixel electrode and a microlens formed in the transmission color liquid crystal display device.

As shown in FIG. 1, the pixel electrodes 17 formed right below respective pixel openings 13a are formed in the order of a pixel electrode 17a corresponding to R, a pixel electrode 17b corresponding to G and a pixel electrode 17c corresponding to B. Namely, as shown in FIG. 6, the pixel electrodes 17a, 17b and 17c respectively corresponding to R, G and B are linearly aligned. Then, the R, G and B-beams 19 shown in FIG. 1 are shed onto the respective pixel electrodes 17a, 17b and 17c as a group of forming a pair of dots through the single microlens 11a (hexagon in FIG. 6).

A display operation of the transmission color liquid crystal display device 1 having the described configuration will be explained.

Figure 2:
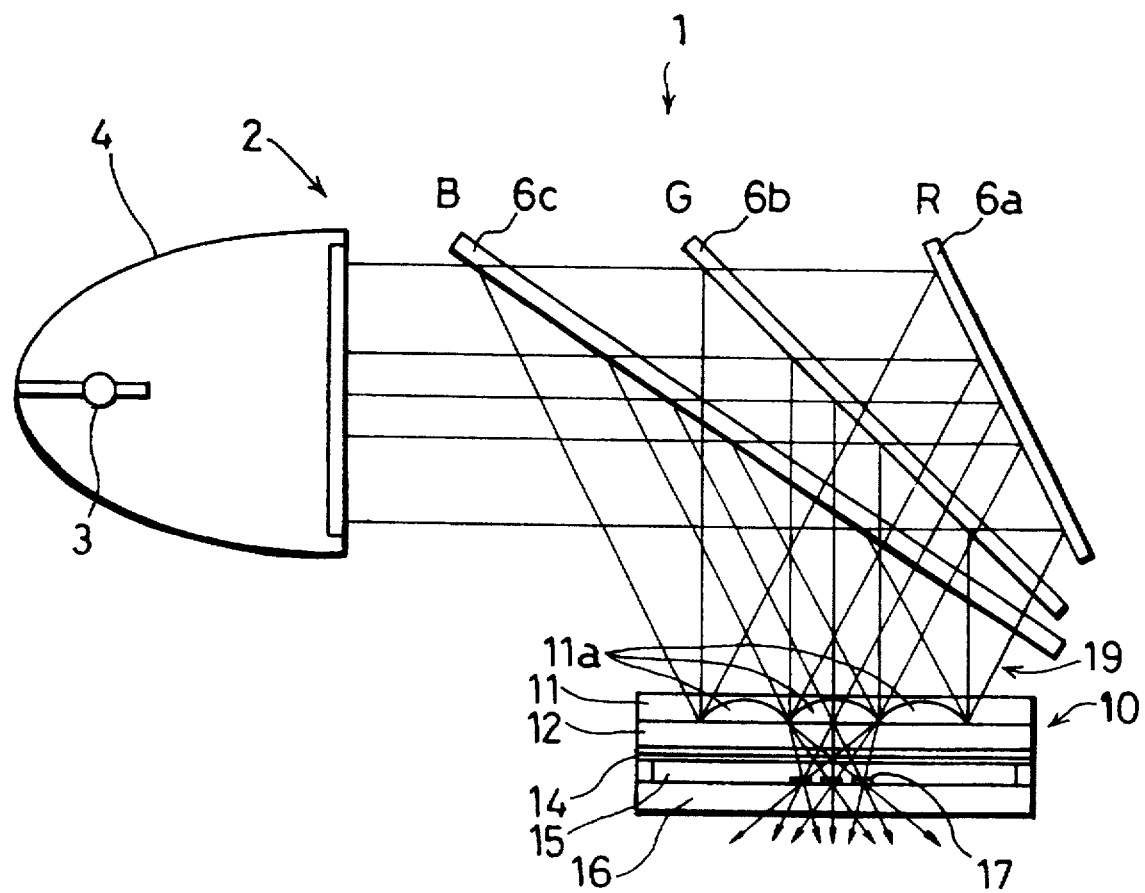
FIG. 2 is an explanatory view showing the transmission color liquid crystal display device.

First, as shown in FIG. 2, white light emitted from the white light source 3 is divided into R, G and B-beams 19 respectively by the dichroic mirrors 6a, 6b and 6c.

Then, as shown in FIG. 1, the R, G and B-beams 19 thus divided are respectively converged onto the pixel opening 13a corresponding to the pixel electrodes 17a, 17b and 17c of the liquid crystal display panel 10 through the microlens 11a of the microlens array 11. Then, the R, G and B-beams 19 transmit through the pixel electrodes 17a, 17b and 17c respectively corresponding to R, G and B, thereby displaying a color image on the light transmission side of the liquid crystal panel 10.

The transmission color liquid crystal display device 1 adopts the driving element composed of the TFT 18, or the MIM, etc., and in any case, has a multi-layer structure. Thus, the process of patterning each layer on the glass substrate 16 is repeated. In this patterning process, for example, if a defective TFT which does not show normal TFT characteristics generates, a voltage may not be applied to the corresponding pixel electrode 17. If this occurs, the pixel electrode 17 to which a voltage cannot be applied would always allow light to transmit therethrough. Thus, in the state where normal pixels 17 block the transmission of light, the pixel electrode 17 corresponding to the defective TFT would be considered as a bright defect.

The present embodiment adopts the following method of concealing the described bright defect shown in FIG. 1. Namely, a light-blocking layer 21 is formed between the microlens 11a of the microlens array 11 and the incident side glass substrate 12 in the liquid crystal panel 10. The light-blocking layer 21 selectively blocks, for example, only the R-beam 19 corresponding to the defective luminance point pixel electrode 17a. The light-blocking layer 21 is made of an ultraviolet curing resin including a dye or pigment in cyan color, etc., which selectively absorbs only the R-beam 19.

Therefore, as shown by an alternate long and short dashed line in FIG. 1, the R-beam 19 is absorbed by the light-blocking layer 21 and is not allowed to transmit through the pixel electrode 17a.

According to the described method, the state where the pixel electrodes 17b and 17c corresponding to G and B block the transmission of light, the pixel electrode 17a corresponding R is also in the light non-transmission state. Thus, the pixel electrode 17a would not be recognized as a bright defect.

For the light-blocking layer 21, the ultraviolet curing resin including a material which selectively absorbs only the R-beam 19 shed onto the defective luminance point pixel electrode 17a is used. As to materials for selectively absorbing the respective G, B-beams, for example, dyes or pigments in magenta color, yellow color, etc., which are the respective complementary colors of the G and B may be used. Therefore, in the case where the luminance point defect is generated in the pixel electrodes 17b and 17c corresponding to G and B, the light-blocking layer 21 made of the ultraviolet curing resin including the described material may be formed. Even in the case where the bright defect is formed in plural pixel electrodes 17 at one time, by the use of the resin including the material in the complementary color, the bright defect can be concealed with respect to light incident on these defective pixel electrodes 17.

Lastly, the experiments conducted for proving the effect of the bright defect concealing method of the present invention will be briefly explained. In the experiment, the liquid crystal panel 10 (pixel element pitch: 100 μm×100 μm, area of pixel opening 13a: 50 μm×50 μm, thickness of the incident side glass substrate 12: 1.1 mm, the thickness of the light coming-out side glass substrate 16: 1.1 mm (1.1/1.52= 720 μm (converted into air)) was adopted. In the experiment, the microlens 11a with the pitch of 100 μm (length)×300 μm (width) was adopted, and the incident angle θ (see FIG. 1) of the R and B-beams 19 was set to $\tan^{-1}100/720 = 7.9°$. As a result, only the bright defect of the pixel electrode 17a corresponding to R could be concealed.

As described, the method of concealing a bright defect of the transmission color liquid crystal display device 1 of the present embodiment is characterized in that the light-blocking layer 21 for selectively blocking only the R-beam 19 shed onto the defective luminance point pixel electrode 17a is formed on an optical path of the R, G and B beams 19. The light-blocking layer 21 is made of an ultraviolet curing resin including a material which selectively absorbs only the R-beam 19.

Therefore, when irradiating the pixel electrodes 17a, 17b and 17c with R, G and B-beams 19 having mutually different wavelengths respectively through the single microlens 11a, only the R-beam 19 irradiating the defective luminance point pixel electrode 17a would be blocked as being absorbed by the light-blocking layer 21. As a result, the R-beam 19 is not allowed to transmit through the liquid crystal display panel 10, thereby easily concealing the bright defect.

On the other hand, the G and B-beams 19 shed onto the normal pixel electrodes 17b and 17c surrounding the defective pixel electrode 17a, wherein no bright defect is generated, will be transmitted through the liquid crystal panel 10 without being absorbed by the light-blocking layer 21.

Therefore, even in the case of adopting the transmission color display device 1 wherein plural pixel electrodes 17a, 17b and 17c correspond to the single microlens 11a, only the defective luminance point pixel electrode 17a can be concealed without adversely affecting the normal pixel electrodes 17b and 17c, thereby improving a display quality of the transmission color display device 1.

EMBODIMENT 2

Figure 7:
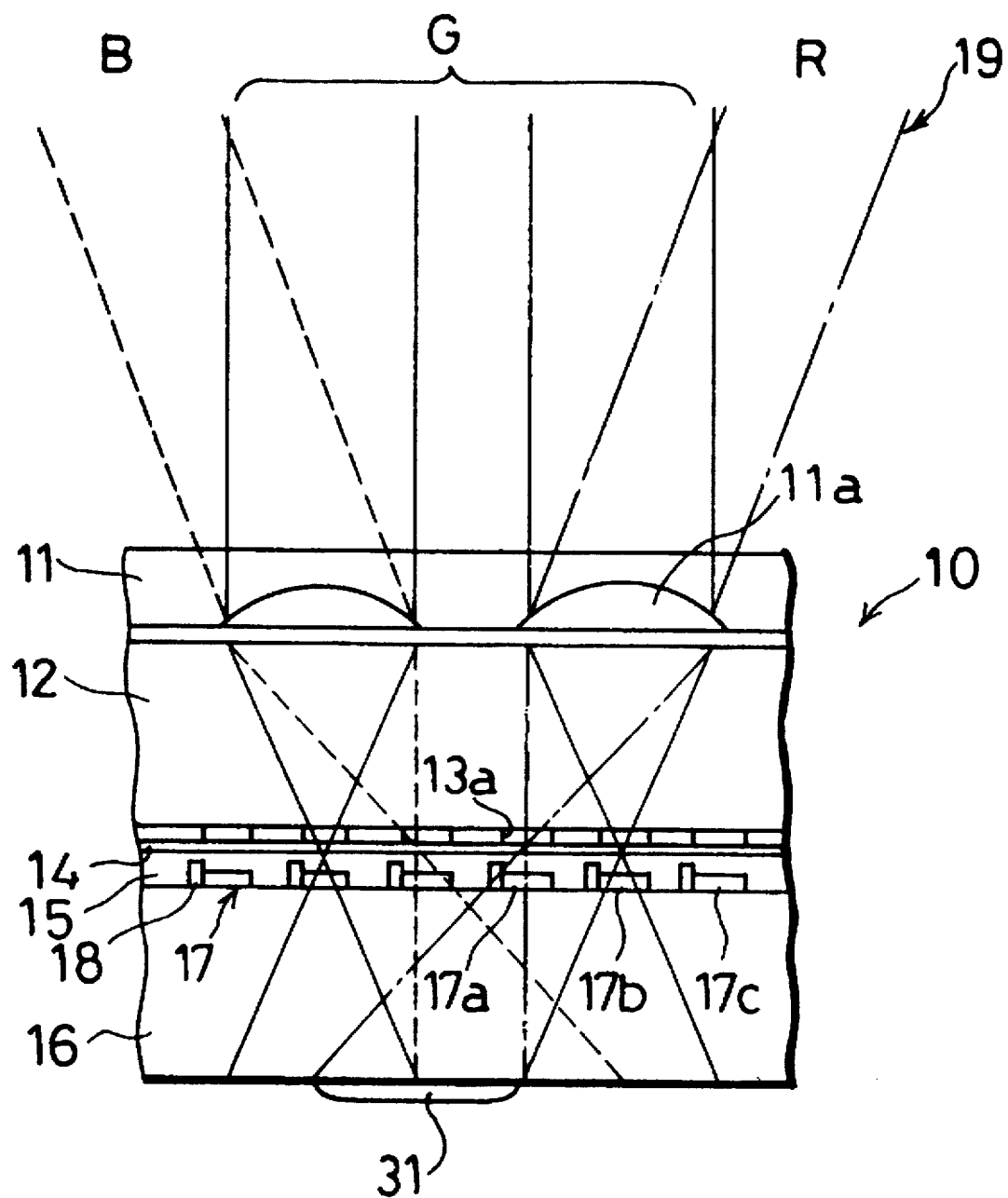
FIG. 7 is an explanatory view showing a liquid crystal display panel of a transmission color liquid crystal display device adapting a method of concealing a bright defect in accordance with another embodiment of the present invention.
Figure 8:
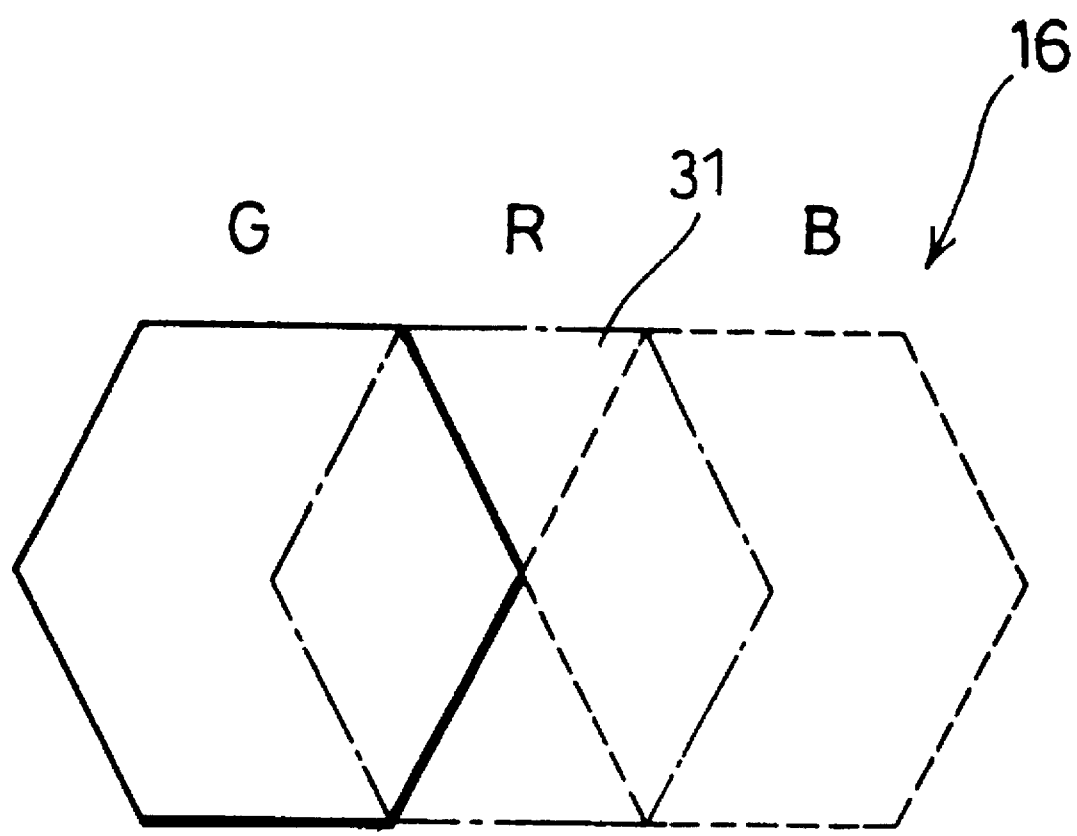
FIG. 8 is an explanatory view showing the extension of the beam on a surface on the light coming-out side of a light coming-out side glass substrate in the liquid crystal display panel.
Figure 9:
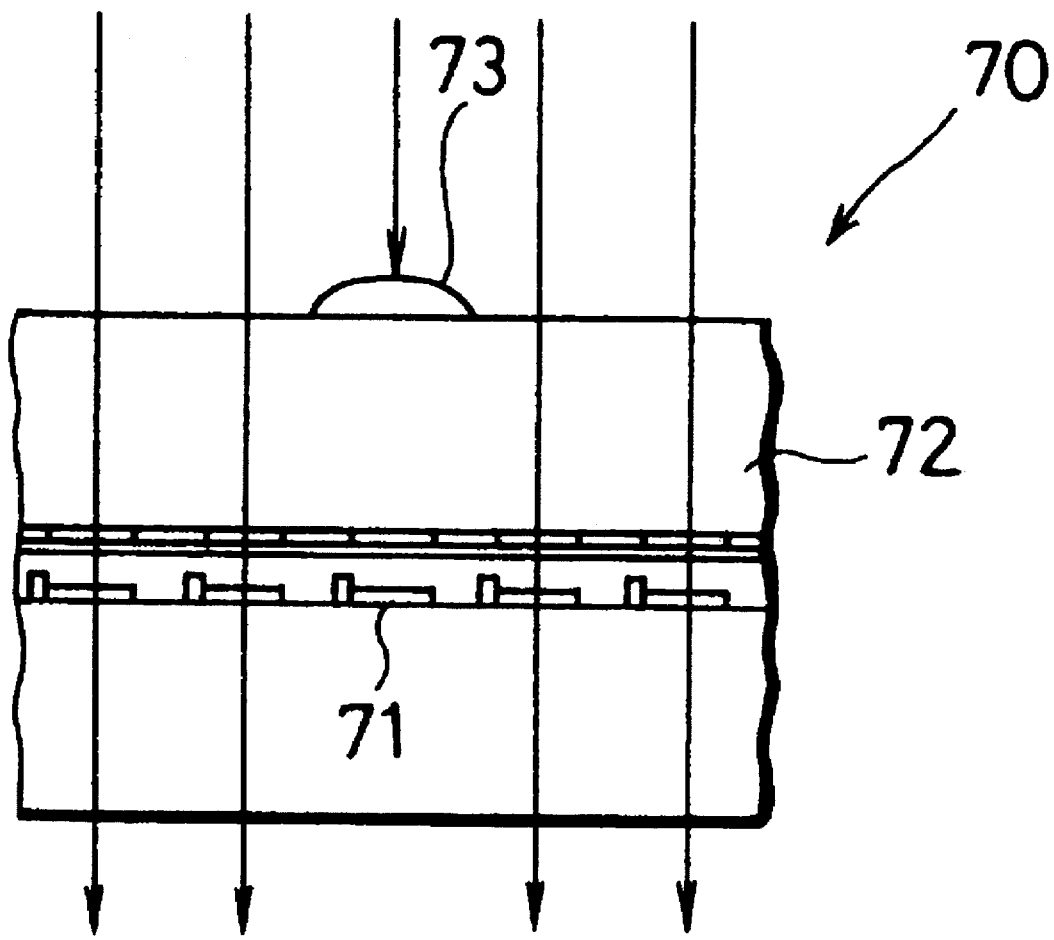
FIG. 9 is an explanatory view showing a conventional method of concealing a defective luminance point designed for a transmission liquid crystal display device.
Figure 10:
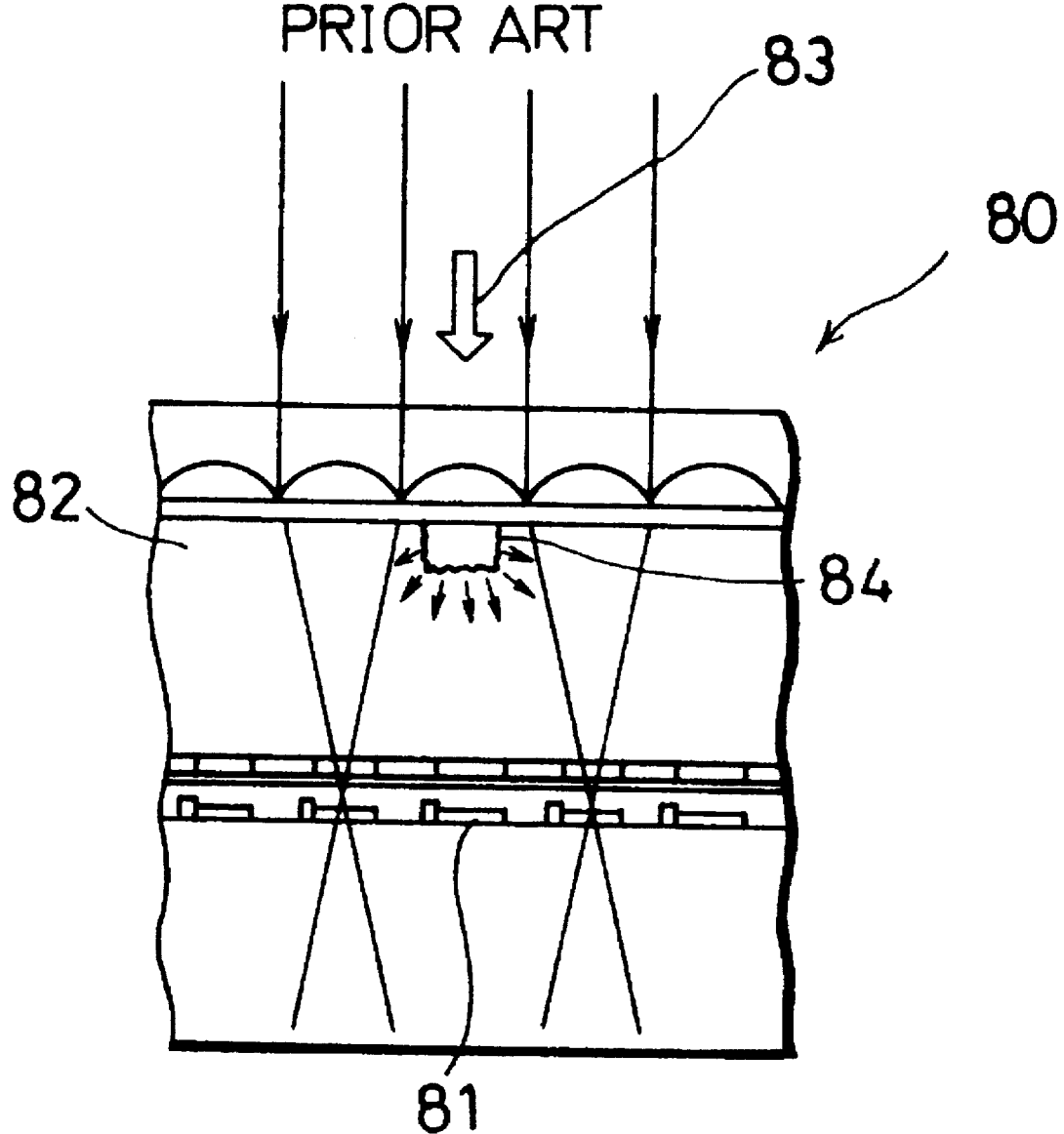
FIG. 10 is an explanatory view showing another conventional method of concealing a bright defect in the transmission liquid crystal display device.

The following descriptions will discuss another embodiment of the present invention in reference to FIG. 7 and FIG. 8. For convenience in explanations, members having the same functions as those of the aforementioned embodiment will be designated by the same reference numerals, and thus the descriptions thereof shall be omitted here.

In the present invention, the configuration of the transmission color liquid crystal display 1 and the incident angle θ of the R and B-beams 19 are the same as those of the first embodiment. As shown in FIG. 7, a light-blocking layer 31 for selectively absorbing only the R-beam 19 shed onto the defective luminance point pixel electrode 17a is formed on the surface on the light coming-out side of the light coming-out side glass substrate 16. The light-blocking layer 31 is made of, for example, an ultraviolet curing resin including a dye or a pigment in cyan color, etc., which selectively absorbs the R-beam 19 as in the case of the first embodiment. As shown in FIG. 8, the application area of the light-blocking layer 31 is the optical path area (within the area surrounded by the alternate long and short dashed line in FIG. 8) of the R-beam 19 on the light coming-out side of the light coming-out side glass substrate 16.

As shown by the alternate long and short dashed line in FIG. 7, the R-beam 19 shed onto the pixel opening 13a by the microlens 11a is transmitted through a liquid crystal layer 15, and reaches the surface on the light coming-out side of the light coming-out side glass substrate 16 of the liquid crystal display panel 10.

As described, the light-blocking layer 31 for selectively absorbing only the beam 19 having the wavelength band corresponding to R is applied in the optical path area (the area surrounded by alternate long and short dashed line in FIG. 8) of the R-beam 19 on the surface on the light coming-out side of the light coming-out side glass substrate 16. Therefore, the R-beam 19 is absorbed by the light-blocking layer 31 and will not be transmitted through the liquid crystal display panel 10. Therefore, only the defective luminance point pixel element electrode 17a corresponding to R can be concealed without adversely affecting the adjoining G and B-beams 19.

In the present embodiment, the light-blocking layer 31 made of a resin including a dye or a pigment, etc., in magenta color or yellow color which are the respective complementary colors of the G and B-beams 19, etc., may be adopted for use in concealing the defective luminance point pixel electrodes 17b and 17c corresponding to G and B.

As described, according to the bright defect compensating method of the transmission color liquid crystal display device 1 of the present embodiment, for example, the light-blocking layer 31 made of an ultraviolet curing resin including a material which selectively absorbs only the R-beam 19 shed onto the defective luminance point pixel electrode 17a is applied to the surface on the light coming-out side of the light coming-out side glass substrate 16. Namely, since the light-blocking layer 31 is applied on the surface on the light coming-out side of the light coming-out side glass substrate in the liquid crystal panel 10 at the portion where the defective luminance point can be confirmed, the defective luminance point pixel can be easily compensated.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A method of concealing a bright defect of a defective luminance point pixel in a transmission display device which displays by selectively transmitting plural beams of different wavelength bands, each band being shed onto corresponding pixels of a transmission display element through microlenses, according to a voltage applied to each pixel, comprising the step of:

selectively blocking only a beam of a wavelength band shed onto the defective luminance point pixel.

2. The method of concealing a bright defect as set forth in claim 1, wherein a beam is blocked by an ultraviolet-curing resin including a material which selectively absorbs a beam of at least one wavelength band to be blocked.

3. The method of concealing a bright defect as set forth in claim 2, wherein said material includes a dye.

4. The method of concealing a bright defect as set forth in claim 2, wherein said material includes a pigment.

5. A transmission display element, comprising:

a pair of transparent substrates for sealing a light-transmitting material whose transmittance varies in response to an applied voltage;

pixel electrodes for applying a voltage to said light-transmitting material, said pixel electrodes being arranged in a matrix form on one of said transparent substrates;

microlenses for directing plural beams of different wavelength bands toward the pixel electrodes, such that each microlens receives and directs beams of plural wavelength bands, and each pixel electrode receives beams of a single wavelength band; and light-blocking means for selectively blocking only a beam of a wavelength band shed onto a defective luminance point pixel electrode.

6. The transmission display element as set forth in claim 5, wherein said light-blocking means is made of an ultraviolet-curing resin including a material which selectively absorbs a beam of at least one wavelength band to be blocked.

7. The transmission display element as set forth in claim 6, wherein:

said material includes a dye.

8. The transmission display element as set forth in claim 6, wherein:

said material includes a pigment.

9. The transmission display element as set forth in claim 5, wherein:

a transparent electrode for applying a voltage to the light transmitting material together with said pixel electrodes is formed on an incident side substrate of said pair of transparent substrates, through which light comes into said light transmitting material;

said pixel electrodes and switching elements for switching a signal voltage to be applied to each pixel electrode are formed on a light coming-out side substrate of said pair of transparent substrates, through which light comes out of the transmission display element; and said microlenses are formed on a light incident side of the incident side substrate.

10. The transmission display element as set forth in claim 9, wherein:

said light-blocking means is formed between said microlens placed on an optical path of the beam to be blocked and the light incident side substrate.

11. The transmission display element as set forth in claim 9, wherein:

said light-blocking means is formed on an optical path of the beam to be blocked on the light coming-out side substrate.

12. The transmission display element as set forth in claim 11, wherein:

said light-blocking means is formed on a surface on the light coming-out side of the light coming-out side substrate.

13. The transmission display element as set forth in claim 9, wherein:

said switching element is a thin film transistor.

14. The transmission display element as set forth in claim 9, wherein:

said switching element is a Metal-Insulator-Metal.

15. A transmission color liquid crystal display device, comprising:

a transmission display element for modulating an intensity of light incident thereon; and light emitting means for emitting light to said transparent display element, wherein said transmission display element includes:

a pair of transparent substrates for sealing a light/transmitting material whose optical transmittance varies in response to an applied voltage;

pixel electrodes for applying a voltage to said transmitting material, said pixel electrodes being arranged in a matrix form on one of said transparent substrates;

microlenses for directing plural beams of different wavelength bands toward the pixel electrodes, such that each microlens receives and directs beams of plural wavelength bands, and each pixel electrode receives beams of a single wavelength band; and light-blocking means for selectively blocking only a beam of a wavelength band shed onto a defective luminance point pixel electrode.

16. The transparent color liquid crystal display device as set forth in claim 15, wherein said light emitting means includes:

a white light source for emitting white light;

a reflective mirror for reflecting the white light emitted from said white light source; and plural dichroic mirrors for reflecting therefrom a beam of a predetermined wavelength band of reflected light from said reflective mirror to said transmitting display element.

* * * * *